United States Patent [19]
Brown

[11] 4,438,793
[45] Mar. 27, 1984

[54] AERIAL REFUELING BOOM NOZZLE

[75] Inventor: Albert W. Brown, Newport Beach, Calif.

[73] Assignee: International Telephone & Telegraph Corp., New York, N.Y.

[21] Appl. No.: 259,838

[22] Filed: May 4, 1981

[51] Int. Cl.³ .............................................. B65B 3/04
[52] U.S. Cl. .................................... 141/382; 141/392;
141/346; 244/135 A; 285/18; 285/310;
285/320; 285/DIG. 21
[58] Field of Search ......... 285/310, 320, 18, DIG. 21;
141/349–362, 382–389, 279, 98, 392, 346, 347,
348, 301, 302, 94; 244/135 A, 163; 251/149,
149.9; 137/614, 614.01, 614.02, 614.03, 614.04,
614.05, 614.06

[56] References Cited
U.S. PATENT DOCUMENTS

| 2,617,050 | 11/1952 | Weinfurt | 285/DIG. 21 |
| 2,632,821 | 3/1953 | Wright et al. | 285/DIG. 21 |
| 2,634,926 | 4/1953 | Worlidge | 285/DIG. 21 |
| 2,634,927 | 4/1953 | Smith et al. | 285/DIG. 21 |
| 3,128,009 | 4/1964 | Norton | 285/DIG. 21 |
| 3,140,730 | 7/1964 | Costes | 285/DIG. 21 |
| 3,199,553 | 8/1965 | Garrett et al. | 285/DIG. 21 |
| 3,249,013 | 5/1966 | Pride et al. | 285/DIG. 21 |
| 3,319,978 | 5/1967 | Melhose | 285/DIG. 21 |
| 3,754,780 | 8/1973 | Pogonowski | 285/DIG. 21 |
| 4,335,904 | 6/1982 | Sauiger et al. | 285/DIG. 21 |

Primary Examiner—Houston S. Bell, Jr.
Attorney, Agent, or Firm—T. E. Kristofferson; T. L. Peterson

[57] ABSTRACT

A nozzle for an aerial refueling boom is disclosed in which the locking latches on the nozzle housing are operated by a solenoid which allows the latches to be moved to an unlocked position by the operator in the aerial refueling tanker. The nozzle embodies an inlet fitting at its forward end which is adapted to be fixed to the boom. A nondestructive detent arrangement releasably couples the nozzle housing to the inlet fitting so that if the housing is deflected at an excessive angle, it will break away from the fitting and thus the boom without damaging the boom.

10 Claims, 6 Drawing Figures

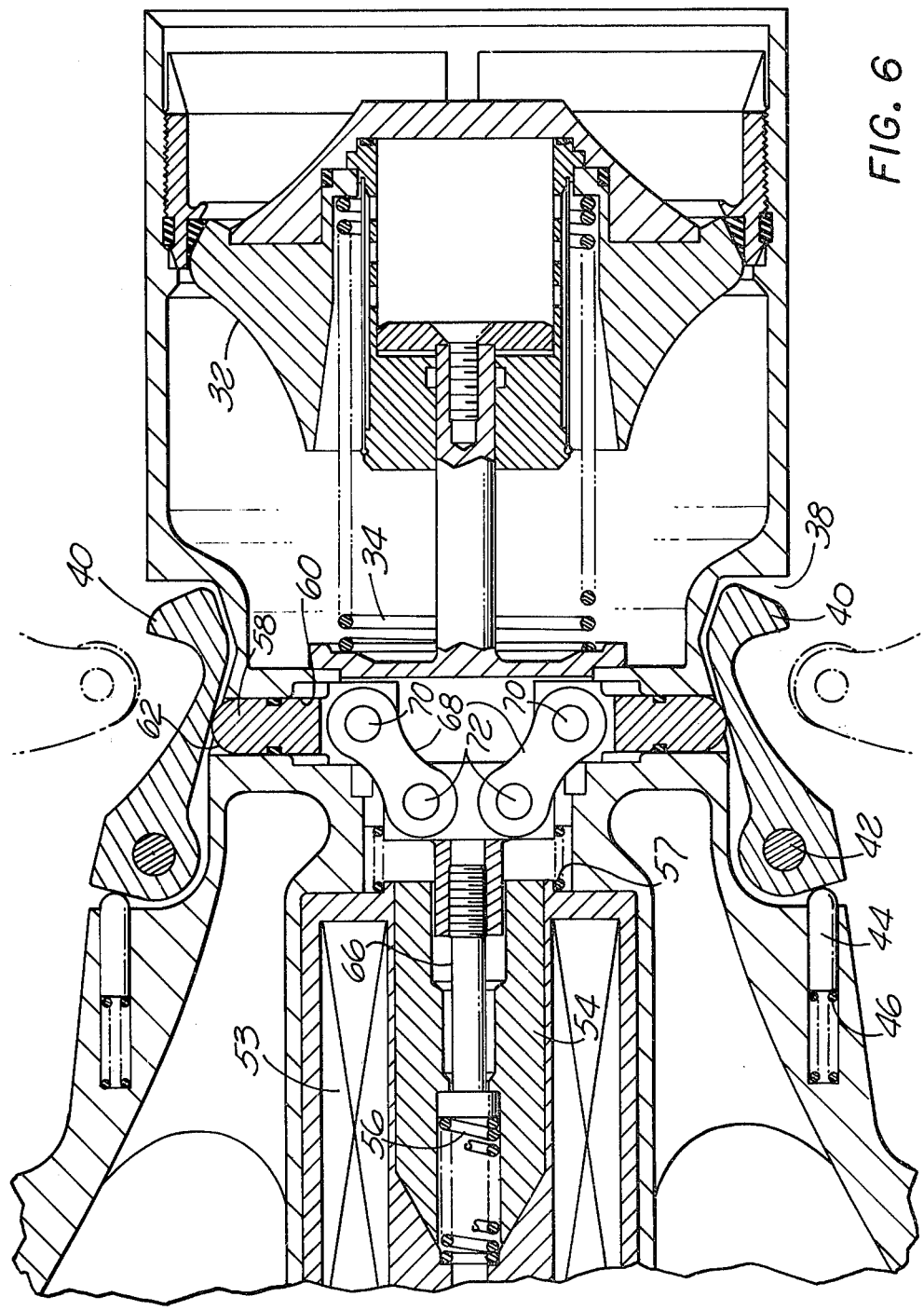

AERIAL REFUELING BOOM NOZZLE

BACKGROUND OF THE INVENTION

The present invention relates generally to a nozzle and, more particularly, to a nozzle for an aerial refueling boom.

In a typical aerial refueling system an aerial refueling tanker incorporates a boom which extends outwardly and downwardly from the rear of the tanker. The boom is controlled by an operator in the tanker who can guide a nozzle on the end of the boom into engagement with a receptacle in the receiver aircraft.

After the boom operator has guided the boom nozzle into the receiver aircraft receptacle, latches within the receptacle are shifted by hydraulic actuators to lock the nozzle into the receptacle. Such actuators are operated automatically or by personnel in the receiver aircraft. Once the nozzle is engaged in the receptacle, then fuel can be transferred from the tanker to the receiver or, in some cases, when the tanker is low on fuel, fuel is transferred from the receiver to the tanker using receiver boost pumps.

Occasionally it is necessary to make an emergency disconnection between the boom nozzle and the receptacle in the receiver aircraft. One reason for making such a disconnection is when there is a component failure within either the receptacle or within the tanker equipment. A second reason for making such an emergency disconnection is when the receiver aircraft wanders outside of the safe operating range causing either the nozzle to be broken off from the boom, or completely breaking the boom from the tanker aircraft with corresponding hazards occurring.

At the present time, there are three methods for effecting a disconnection between the boom nozzle and the receiver aircraft receptacle. The normal method consists of personnel in the receiver aircraft actuating a control valve therein that causes the hydraulic actuator to rotate the latches in the receptacle so that they no longer engage the boom nozzle. In the second method, the receiver latch release mechanism is triggered by the boom operator in the tanker aircraft by means of an electrical signal transmitted through communications coils at the nozzle/receptacle interface. The third method is called "Brute Force" which requires decreasilng the speed of the receiver aircraft sufficiently relative to the refueling tanker either by reducing its power or by extending flaps or other drag inducing devices to put sufficient force on the nozzle and, in turn, on the latches of the receptacle to overpower the hydraulic pressure which controls the latches. The first two methods have proved to be not sufficiently reliable and the third method is somewhat dangerous and can cause aircraft damage.

A requirement has been established for an improved aerial refueling boom nozzle which allows the boom operator to make an emergency disconnection of the nozzle from the receptacle in the receiver aircraft that does not depend on operation of the receptacle latches. One method which has been proposed for achieving this result involves the use of a pneumatic actuating cylinder and a pressurized gas storage bottle for operating the latches in the boom nozzle. The requirement in such an arrangement for a pressurized gas storage bottle necessitates that the bottle be recharged before every mission of the refueling tanker. Furthermore, use of a gas storage bottle requires major modifications to be made to the boom in order to accept the bottle. Such modifications would add considerable expense to the cost of the refueling system. In addition, recharging of the gas storage bottle involves considerable maintenance service throughout the lifetime of the aircraft. Also, high pressure gas may not always be available for recharging the bottles at certain airfields where the refueling tanker may be required to land.

It is therefore the object of the present invention to provide an improved boom nozzle which may be operated by the boom operator in the tanker aircraft for making emergency disconnections from the receptacle in the receiver aircraft and does not depend upon operation of the receptacle latches, and which is relatively compact so as to not require any modification of the boom, and is relatively inexpensive to install, operate and maintain.

SUMMARY OF THE INVENTION

According to a principal aspect of the present invention, there is provided a nozzle for an aerial refueling boom comprising a housing containing a solenoid including a coil and an armature movable parallel to the longitudinal axis of the housing between first and second positions. A pair of latches are mounted in recesses on opposite sides of the housing each pivotable about an axis transverse to the longitudinal axis of the housing. Spring means normally bias the latches inwardly into the recesses into a release or unlock position. Radially movable cam elements in the housing engage the undersides of the latches. Means are provided operatively connecting the cam elements and the armature. In the first position of the armature the cam elements are located in a retracted position allowing the latches to assume their release position. In the second position of the armature the cam elements are forced outwardly via the connecting means to an extended position pushing the latches outwardly from the recesses into a locking position.

Since the boom nozzle latches are operated by a solenoid, and electrical power is available at the end of the boom in an aerial refueling system, the boom operator may control the solenoid and, thus, operate the nozzle latches, thereby rapidly disconnecting such latches from the receptacle latches in the receiver aircraft.

BRIEF DESCRIPTION OF THE DRAWINGS

FIG. 6 is a longitudinal sectional view showing the rear portion of the nozzle with the latches thereof in their retracted, unlocked position.

DESCRIPTION OF THE PREFERRED EMBODIMENT

Figure 1:
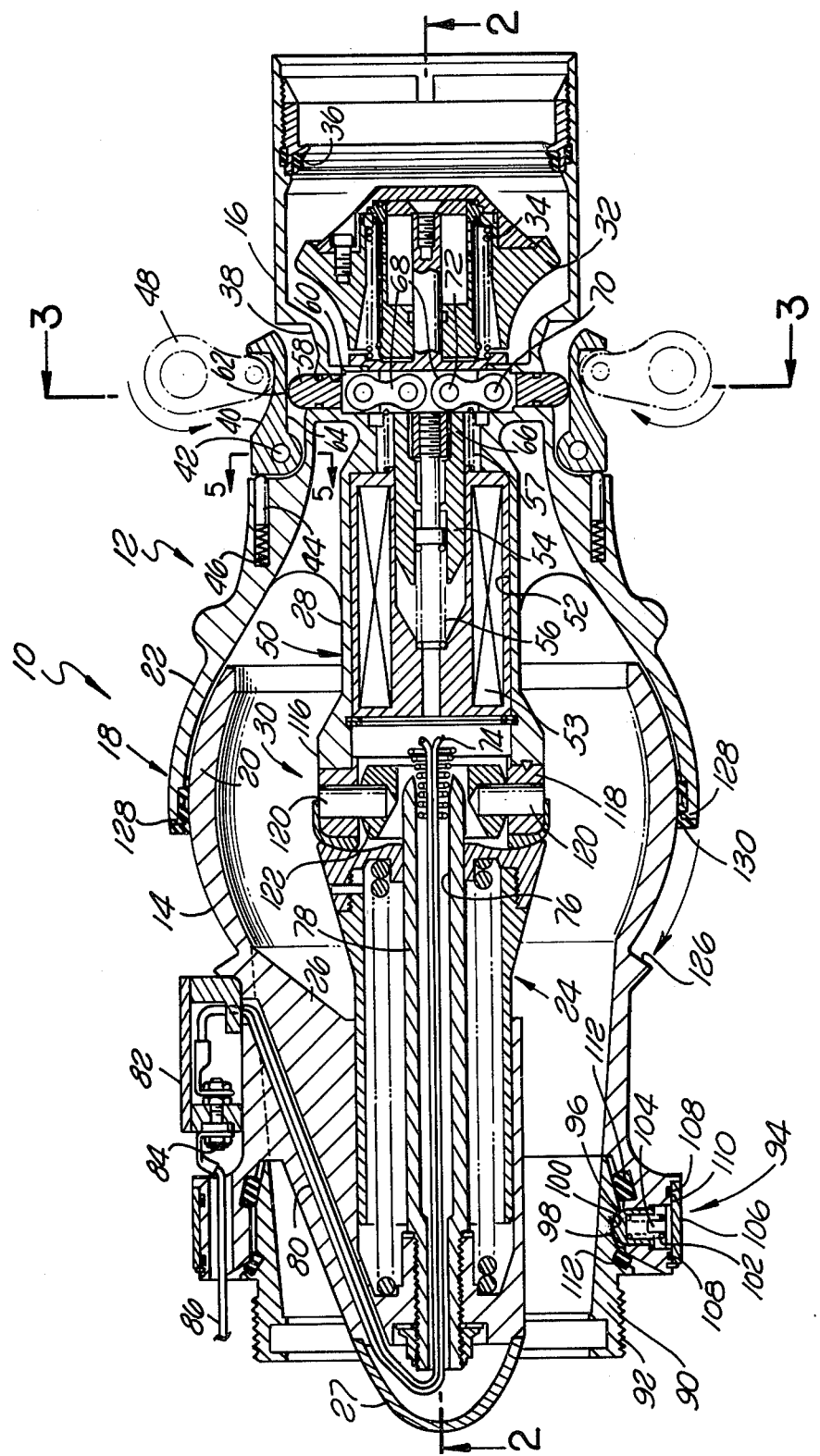
FIG. 1 is the vertical longitudinal sectional view through the nozzle of the present invention showing the nozzle latches in their locking position.

Referring now to the drawings in detail, the boom nozzle of the present invention, generally designated 10, comprises a housing 12 having a forward inlet section 14 and a rear outlet section 16. The forward section of the housing is adapted to be connected to the boom of an aerial refueling tanker while the outlet section of the nozzle is adapted to couple with a receptacle in the receiver aircraft, not shown.

Figure 3:
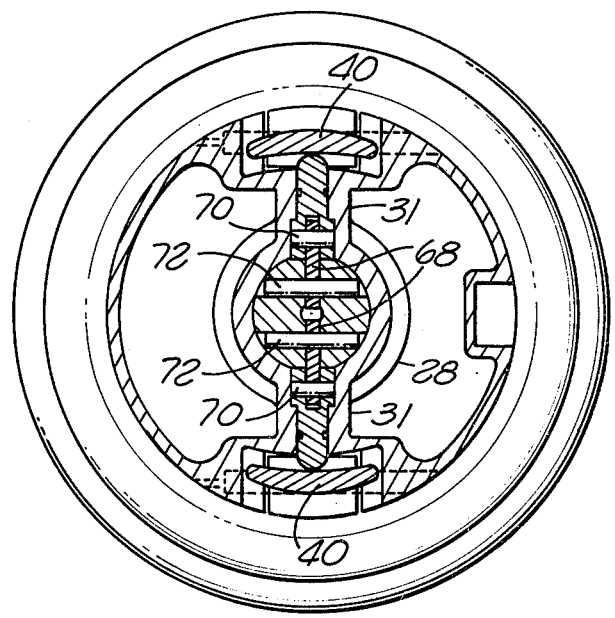
FIG. 3 is a transverse sectional view taken along line 3—3 of FIG. 1.
Figure 4:
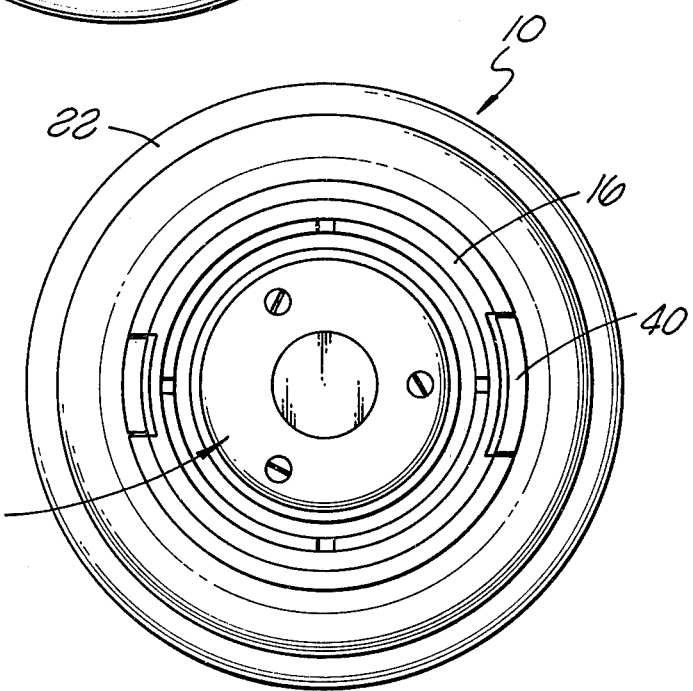
FIG. 4 is a rear end view of the nozzle illustrated in FIGS. 1 and 2.
Figure 5:
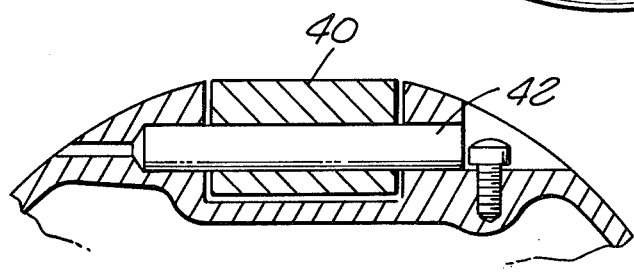
FIG. 5 is a fragmentary transverse sectional view taken along line 5—5 of FIG. 1 showing the pivot pin for one of the latches.

A ball joint, generally designated 18, is provided between the inlet and outlet sections of the housing. The ball joint is formed by a rear partially hemispherical male portion 20 of the inlet section 14 of the housing which has a rotatable, sliding fit within a partially hemispherical forward female portion 22 of the outlet section 16 of the housing. A spring loaded universal joint stem assembly, generally designated 24, is centrally supported in the inlet section 14 of the housing by a radially extending strut 26. The stem assembly 24 is closed at its forward end by a protective cover 27. The outlet section 16 of the housing embodies an inner part 28 which is coupled to the stem assembly 24 by a universal joint, generally designated 30. The inner part 28 is supported in the outlet section of the housing by radial webs 31, as best seen in FIG. 3. The rear of the outlet section 16 of the housing contains a poppet 32 which is biased rearwarded by a spring 34 to normally engage a sealing ring 36 on the interior of the housing prior to engaging the nozzle with the receptacle in the receiver aircraft, as shown in FIG. 6. Such poppet shifts forwardly in the housing to the position illustrated in FIG. 1 when the nozzle is engaged with the receptacle so that fluid may flow through the nozzle into the receiver aircraft fuel tank.

A pair of recesses 38 are formed in the opposite sides of the outlet section 16 of the housing. Each recess receives a latch 40 which is pivotably mounted on a pin 42 which extends transversely of the longitudinal axis of the nozzle. Rods 44 biased by springs 46 normally urge the latches 40 inwardly into the recesses in their unlocked position as seen in FIG. 6. When the latches are actuated outwardly, they engage with mating latch elements 48 of the receiver aircraft receptacle, not shown, which receives the boom nozzle.

The structure of the boom nozzle 10 described so far is generally conventional and constitutes no part of the present invention.

For controlling the position of the latches 40, there is provided a solenoid, generally designated 50, which is mounted within a cavity 52 in the forward portion of the inner part 28 of the outlet section of the housing. The solenoid includes a coil 53 which surrounds an armature 54 which is slidable along the longitudinal axis of the nozzle. Two springs 56 and 57 normally bias the armature to an extended position as shown in FIG. 1. Radially movable cam elements 58 are mounted in bores 60 in the wall of the outlet section of the housing so that the outer curved surfaces 62 of the cam elements engage the undersides 64 of the latches. A plunger 66 is slidably mounted in the rear of the armature 54. Toggle links 68 are pivotably mounted by pins 70 and 72 to the cam elements 58 and plunger 66, respectively.

The solenoid 50 as shown in FIG. 1 is in its de-energized condition allowing the springs 56 and 57 to push the armature 54 and, hence, the plunger in the rightward direction. This causes the links 68 to push the cam elements 58 outwardly in their respective bores 60, thereby pushing the latches 40 outwardly in the recesses 38 where they will latch to and lock with the receptacle latches 48. In this position of the toggle links 68, the links provide an unyielding stiff member between the latches to prevent their depression.

The conductors 74 for the coil of the solenoid extend through a central bore 76 in the shaft 78 of the stem assembly 24 and outwardly through a passage 80 in the strut 26 to a terminal box 82 on the exterior of the nozzle housing. The conductors 74 are connected to terminals 84, only one being seen in FIG. 1, which in turn are coupled to conductors 86 leading to the boom operator controls in the aerial refueling tanker. Thus, the boom operator may directly control the latches 40 and, thereby, effect a disconnection between the boom nozzle and the receiver aircraft in an emergency situation. The solenoid utilized in the nozzle of the present invention is very compact and, therefore, may be easily installed in a nozzle of the same size as conventional nozzles, and without the requirement of modifying the boom for the nozzle. Furthermore, the solenoid operates off of power which is already available in the refueling tanker, thus not requiring substantial modification of the boom and the installation therein of pressurized gas storage bottles as has been proposed in the past.

To disengage the latches 40 of the boom nozzle from the receptacle latches 48, the solenoid coil is energized by the boom operator thereby causing the armature 54 to shift in a leftward direction to the position illustrated in FIG. 6. This allows the spring biased rods 44 to push the latches 40 inwardly into the recesses 38 so that the links 68 and plunger 66 will assume the position seen in FIG. 6. Thus, the boom nozzle may disconnect from the receiver aircraft receptacle, whereupon the spring 34 will push the poppet 32 to its closed position as illustrated in FIG. 6 thus closing the end of the nozzle and preventing any fuel from escaping from the end of the boom.

An inlet fitting 90 is mounted in the forward end of the inlet section 14 of the housing. The fitting is externally threaded as indicated at 92 for coupling with the end of the boom, not shown. A generally annular non-destructive structural "fuse" arrangement, generally designated 94, is provided between the fitting 90 and the inlet section of the housing. Such arrangement comprises a plurality of structural fuses or detent elements 96 spaced circumferentially around the end of the housing. For example, there may be from twelve to sixteen of such fuses depending on the diameter of the nozzle. Each detent element 96 embodies an inner semi-hemispherical cam surface 98 which is normally engaged with a dished detent recess 100 in the outer surface of the fitting 90. The detent element 96 is urged into the recess 100 by a spring 102 surrounding at its outer end a spring guiding element 104. The detent assemblies are retained in the inlet section 14 of the housing by a clamping ring 106. O-rings 108 are arranged on opposite sides of the detent assembly between the outer surface 110 of the forward end of the inlet section 14 and the clamping ring 106, while a second set of O-rings 112 are positioned on opposite sides of the detent arrangment between the inner surface of the housing and the outer surface of the fitting 90.

The detent arrangement is provided to prevent bending loads sufficiently harmful to permanently damage the aerial refueling boom. The number of detent elements 96 and the force of the springs 102 are chosen such that when bending forces become excessive, the force acting upon the detent elements will overcome their corresponding springs so that the elements will be cammed out of their respective detent recesses sufficiently far that they no longer retain the fitting 90 attached to the nozzle housing. Thus, the nozzle housing will disconnect from the fitting 90. As a consequence, the major portion of the nozzle will remain attached to the receptacle in the receiver aircraft while the fitting 90 will remain attached to the end of the boom on the aerial refueling aircraft. Since the detent assemblies are non-destructive, they need not be replaced when reassembling the nozzle housing to the fitting when the two aircraft return to ground for maintenance.

Figure 2:
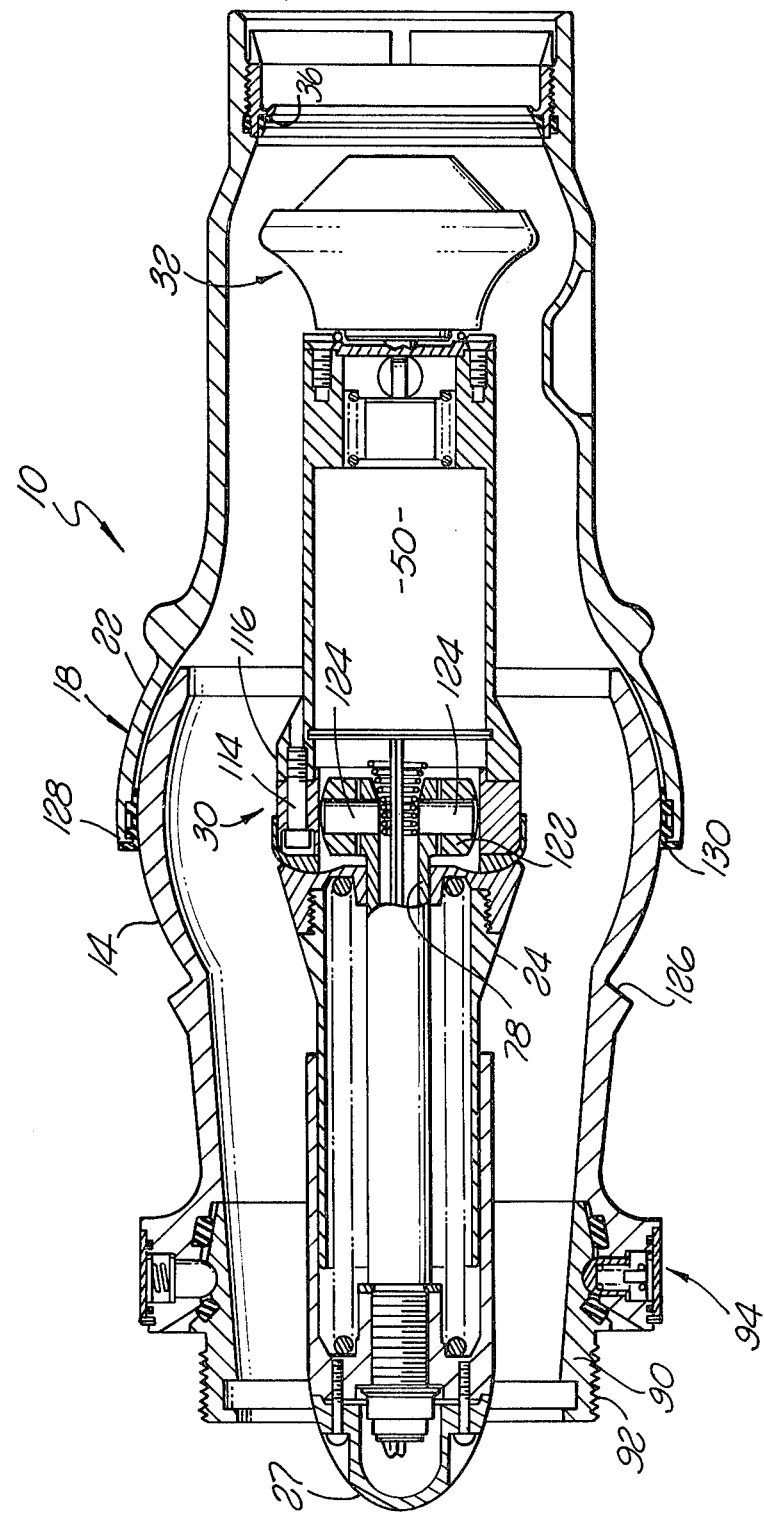
FIG. 2 is the longitudinal sectional view taken along line 2—2 of FIG. 1.

Shear screws 114 shown in FIG. 2 are provided in the universal joint 30 for preventing excessive tension loads being applied to the boom. It is noted that the yoke 116 extending forwardly from the inner part 28 of the outlet section 16 of the housing includes a support ring 118 which is attached to the yoke by the shear screws 114. The pivot pins 120 of the U-joint which are connected to the center ring 122 are mounted in the support ring 118. A second set of pins 124 pivotally connect the inner ring 122 of the U-joint to the stem shaft 78, as seen in FIG. 2. When the shear screws 114 break under excessive tension loads, the inlet and outlet sections of the nozzle housing 12 are allowed to separate thereby preventing damage to the aerial refueling boom.

It is also desirable to provide an indication that the inlet and outlet sections of the housing have undergone high angular deflections, for example 30°, so that maintenance personnel will be warned that they should inspect the interior of the nozzle for possible damage. To this end, according to another feature of the invention, a rearwardly facing annular stop shoulder 126 is provided on the inlet section 14 of the nozzle housing spaced in front of the forward edge 128 of the female portion 22 of the ball joint 18. A deformable ring 130 is mounted on the forward edge 128 of the outlet section of the housing. Such ring may be formed of a suitable plastic which is capable of being permanently deformed, such as polytetrafluoroethylene (Teflon). Thus, if the outlet section 16 of the housing deflects greater than 30° with respect to the inlet section 14, the ring 130 will contact the shoulder 126 on the inlet housing deforming the ring thereby indicating operation of the nozzle out of normal yet not sufficient to activate the internal mechanical fuse arrangement 94 or separate the shear screws 114.

It will be noted that any mechanical fuse, whether it be a shear or tensile separating type, can be partially separated from short duration impacts and become weakened so that normal operating stresses will finally cause separation. It is, therefore, highly desirable to have a reliable indication prior to such separation that the maximum allowable deflection angle has been exceeded, which indication is achieved by the deformable ring 128 of the present invention.

Thus, in summary, the present invention provides a compact and inexpensive latch actuating mechanism which may be installed in a boom nozzle without any modification of the boom or enlargement of the nozzle, and which is effective to provide a suitable locking engagement with the latches on the receptacle of a receiver aircraft, and may be actuated by the boom operator in the refueling tanker. Furthermore, the present invention provides non-destructive structural "fuses" in the form of the detent arrangement 94 and shear screws 114 to avoid damage to the boom resulting from excessive angular deflections or tension loads occurring as the result of the tanker and receiver aircraft moving outside of their normal safe operating range relative to each other. In addition, the ring 130, if deformed, provides an indication to the maintenance personnel that the structural fuses 94 and 114 should be inspected.

What is claimed is:

1. A nozzle for an aerial refueling boom comprising:
a housing having a fluid flow passage therethrough, said housing containing a solenoid including a coil and an armature movable parallel to the longitudinal axis of said housing between first and second positions;
a pair of latches mounted in recesses on opposite sides of said housing outside of said flow passage each pivotable about an axis transverse to said longitudinal axis;
spring means normally biasing said latches inwardly into said recesses into a release position;
radially movable cam elements in said housing engaging the undersides of said latches;
means operatively connecting said cam elements and said armature;
in said first position of said armature said cam elements being located in a retracted position allowing said latches to assume their release position; and
in said second position of said armature said cam elements being forced outwardly via said connecting means to an extended position pushing said latches outwardly from said recesses into a locking position.

2. A nozzle as set forth in claim 1 wherein:
spring means biases said armature to its second position; and
said armature shifts to said first position upon energizing of said coil.

3. A nozzle as set forth in claim 1, including:
an axially slidable plunger between said armature and said cam elements; and
said connecting means comprising toggle links pivotally connected at their respective ends to said plunger and said cam elements.

4. A nozzle as set forth in claim 1 wherein:
said housing embodies a forward end;
an inlet fitting is mounted in said forward end adapted to be connected to an aerial refueling boom;
a plurality of inwardly biased detent elements are circumferentially spaced around said forward end engaging corresponding detent recesses in said inlet fitting for releasably retaining said fitting in said housing; and
said detent elements being forced out of said detent recesses when said housing deflects a predetermined angle relative to said fitting whereby said housing will disconnect from said fitting and, hence, the boom connected thereto.

5. A nozzle as set forth in claim 1 wherein:
said housing includes a forward inlet section and a rear outlet section;
the forward portion of said outlet section and the rear portion of said inlet section being shaped to form a ball joint between said sections;
the forward edge of said outlet section providing a movable shoulder;
a fixed rearwardly forcing shoulder on said inlet section spaced in front of said movable shoulder; and
a deformable element on one of said shoulders engageable by the other shoulder causing said element to deform permanently when said outlet section deflects a predetermined angle relative to said inlet section whereby a visual indication of excessive deflection will be provided.

6. A nozzle as set forth in claim 5 wherein:
said deformable element is a plastic ring secured on said one shoulder.

7. A nozzle as set forth in claim 1 wherein:
said housing includes a forward inlet section and a rear outlet section;
the forward portion of said outlet section and the rear portion of said inlet section being shaped to form a ball joint between said sections;
an inwardly extending strut in said inlet section supporting an axially extending stem therein;
means forming a universal joint between the rear of said stem and a forward inner part of said rear section within the interior of said ball joint;
said coil and armature being mounted in said rear section behind said universal joint;
means defining a passage extending from said coil axially through said stem and outwardly through said strut; and
conductors in said passage means extending from said coil to a position outside of said forward section of said housing.

8. A nozzle as set forth in claim 7 wherein:
said universal joint means includes tension load shear bolts.

9. A nozzle for an aerial refueling boom comprising:
a housing having a forward end;
an inlet fitting mounted in said forward end adapted to be connected to an aerial refueling boom;
a plurality of inwardly biased detent elements circumferentially spaced around said forward end engaging corresponding detent recesses in said inlet fitting for releasably retaining said fitting in said housing; and
said detent elements being forced out of said detent recesses when said housing deflects a predetermined angle relative to said fitting whereby said housing will disconnect from said fitting and, hence, the boom connected thereto.

10. A nozzle as set forth in claim 9 wherein:
said housing includes a forward inlet section embodying said forward end, and a rear outlet section;
the forward portion of said outlet section and the rear portion of said inlet section being shaped to form a ball joint between said sections;
the forward edge of said outlet section providing a movable shoulder;
a fixed rearwardly facing shoulder on said inlet section spaced in front of said movable shoulder; and
a deformable element on one of said shoulders engageable by the other shoulder causing said element to deform permanently when said outlet section deflects a predetermined angle relative to said inlet section whereby a visual indication of excessive deflection will be provided.

* * * * *